United States Patent [19]

Vukasovic

[11] 4,086,621
[45] Apr. 25, 1978

[54] CYCLOCONVERTER AND METHOD FOR ITS OPERATION

[75] Inventor: Lovro Vukasovic, Erlangen, Germany

[73] Assignee: Siemens Aktiengesellschaft, Berlin and Munich, Germany

[21] Appl. No.: 721,490

[22] Filed: Sep. 8, 1976

[30] Foreign Application Priority Data

Sep. 18, 1975 Germany .............................. 2541722

[51] Int. Cl.[2] ............................................. H02M 5/45
[52] U.S. Cl. ........................................ 363/37; 363/49; 363/136
[58] Field of Search ................. 321/4, 14, 45 C, 45 S; 219/10.77; 363/37, 49, 136

[56] References Cited

U.S. PATENT DOCUMENTS

| 3,582,757 | 6/1971 | Achinger | 321/11 |
| 3,599,078 | 8/1971 | Pelly | 321/45 S |
| 3,757,197 | 9/1973 | Bailey | 321/45 C |

FOREIGN PATENT DOCUMENTS 175,117  11/1965  U.S.S.R. .................................. 321/4

*Primary Examiner*—William M. Shoop

*Attorney, Agent, or Firm*—Kenyon & Kenyon, Reilly, Carr & Chapin

[57] ABSTRACT

A method of operating a cycloconverter which is adapted for use with a load in the form of a parallel resonant circuit and for use with an intermediate d-c link supplied by an a-c voltage source and including a smoothing choke and a controlled rectifier, the cycloconverter including an inverter circuit comprising a bridge circuit having output terminals adapted to be connected to the load and input terminals adapted to be connected to the d-c link, in which starting of the cycloconverter is realized by firing the thyristors of an auxiliary commutating device for a time interval sufficient to charge commutation capacitors to a predetermined voltage and the thyristors of the inverter then fired for a time interval sufficient to result in a current of predetermined magnitude, the latter being held constant by controlling the rectifier in the d-c link, and, thereupon, prior to each zero crossing of the resonant circuit voltage, first firing the thyristors of the auxiliary device followed, after a predetermined time interval, by the firing of the thyristors of the inverter and continuing this until the resonant circuit voltage reaches a value sufficient for direct commutation.

1 Claim, 2 Drawing Figures

CYCLOCONVERTER AND METHOD FOR ITS OPERATION

BACKGROUND OF THE INVENTION

1. Field of the Invention

The invention relates to a cycloconverter and, in particular, a cycloconverter which feeds a parallel-resonant circuit as a load.

2. Description of the Prior Art

United States Patent No. 3,599,078 discloses a cycloconverter which comprises an inverter whose output is adapted to be connected to a parallel resonant circuit as the load and whose input is adapted to be connected to an intermediate DC link which is fed by an AC voltage source and which includes a smoothing choke and a controlled rectifier. The inverter of the cycloconverter comprises first and second bridge branches and third and fourth bridge branches, each of which includes a controllable thyristor. An auxiliary commutating device is also provided in the cycloconverter. This commutating device includes first and second converter branches and third and fourth converter branches, each of which branches also includes a controllable thyristor poled in the same direction as the thyristors of the bridge branches. The first and second converter branches are connected in shunt with the first and second bridge branches and a commutation capacitor shunted by a resistor connects the common terminals of the aforesaid bridge and converter branches.

In operation of the above-described known cycloconverter the cycloconverter is load-controlled in the steady state condition and the operating frequency of the inverter is determined by the resonance frequency of the resonant circuit. During such operation, current passes in direct commutation from one bridge branch of the inverter to the bridge branch that carries current next, the reactive commutation power being made available by the capacitor of the parallel resonant circuit. In the starting phase of the cycloconverter, the charge of the load capacitor is not sufficient for direct commutation and indirect commutation via the auxiliary commutation device is necessary during this time.

More particularly, during starting up of the cycloconverter, the thyristors in the first and second converter branches of the auxiliary device and in the first and second bridge branches of the inverter, are fired. These thyristors remain conducting until a given voltage builds up on the commutating capacitor and a given current flows in the choke. During this time, no current flows through the load. Subsequently thyristors of the converter branch that carries current next and of a bridge branch that carries current next and is not connected to the auxiliary commutating device (i.e, the third or fourth bridge branch) are fired, and the previously conducting thyristors are extinguished. At this time, the charge on the commutating capacitor is reversed and a current, which excites an oscillation in the parallel-resonant circuit flows through the load. Thereafter, prior to ech zero crossing of the resonantcurcuit voltage, the thyristors of the bridge branch which conducts next and which is not connected to the commutation capacitor, and the thyristor of the converter branch that conducts next are subsequently fired. As the aforesaid switching cycle is repeated, the voltage at the capacitor of the parallel-resonant circuit becomes larger and larger. When such voltage reaches a value which is sufficient for direct commutation, only thyristors in diagonal bridge branches of the inverter are still fired and the thyristors of the auxiliary commutating device remain unfired. At this point the cycloconverter now operates in normal operation and the residual charge on the commutating capacitor is dissipated in the parallel-connected resistor. As is apparent from the above, the aforesaid cycloconverter is not load-controlled during the start-up phase, but is self-commutated at the frequency of the resonant-circuit voltage. This result, however, is achieved by means of a very complicated control comprising complicated logic circuitry.

It is an object of the present invention to provide a cycloconverter of the above type which is designed so as to permit improved and simpler operation during its start-up phase.

SUMMARY OF THE INVENTION

In accordance with the principles of the present invention, the above and other objects are accomplished in a cycloconverter of the above type by providing that the third and fourth converter branches be arranged in shunt with the third and fourth bridge branches of the inverter and, further, by connecting a further commutation capacitor between the common terminals of the former converter branches and the common terminal of the latter bridge branches. Preferably, the aforesaid commutation capacitor should have the same capacity as the capacitor connecting the first and second converter and bridge branches.

With the cycloconverter designed as aforesaid, control of the cycloconverter is simplified as the control employed for the normal operation of the inverter can now also be used for the thyristors of the auxiliary commutating device. Moreover, the auxiliary commutating device need be designed only for a fraction of the resonant-circuit power. Thus the thyristors of the device may have low power ratings and the commutating capacitors may have small capacities. As a result of the substantial simplification of the control necessary for the cycloconverter, it remains extremely economical in spite of the extra components needed.

In a further aspect of the invention an advantageous method of operating the cycloconverter is disclosed in which the thyristors of diagonal converter branches of the auxiliary commutating device are fired at the start of the operation and remain conducting for a time interval sufficient to charge the commutating capacitors to a predetermined voltage. After this voltage is reached the thyristors of the diagonal bridge branches of the inverter are fired and remain conducting for a time interval sufficient to create a current of constant, predetermined magnitude, this current being held constant during the entire starting operation of the cycloconverter. When the desired current is reached, the thyristors of the converter branches designated to carry current next are fired, the latter firing being followed after a predetermined constant time interval dependent on the resonant-circuit voltage and the constant current, by a firing of the bridge next in sequence to carrying current. Subsequently, prior to each zero crossing of the resonant-circuit voltage, the aforesaid firing of the converter branches followed by the delayed firing of the corresponding bridge branches of the inverter is repeated until a resonant-circuit voltage is reached which is sufficient for direct commutation.

By operating the cycloconverter of the invention as above-described, soft starting of the cycloconverter is achieved while the control thereof is simplified. During the starting operation no additional values need be measured other than those required to be measured during normal operation. In addition, the cycloconverter can be started up independently of the load current, due to adjusting such current to be a constant. The cycloconverter, therefore, can be used with different loads.

BRIEF DESCRIPTION OF THE DRAWINGS

The above and other features and aspects of the present invention will become apparent upon reading the following detailed description in conjunction with the accompanying drawings, in which.

DETAILED DESCRIPTION

Figure 1:
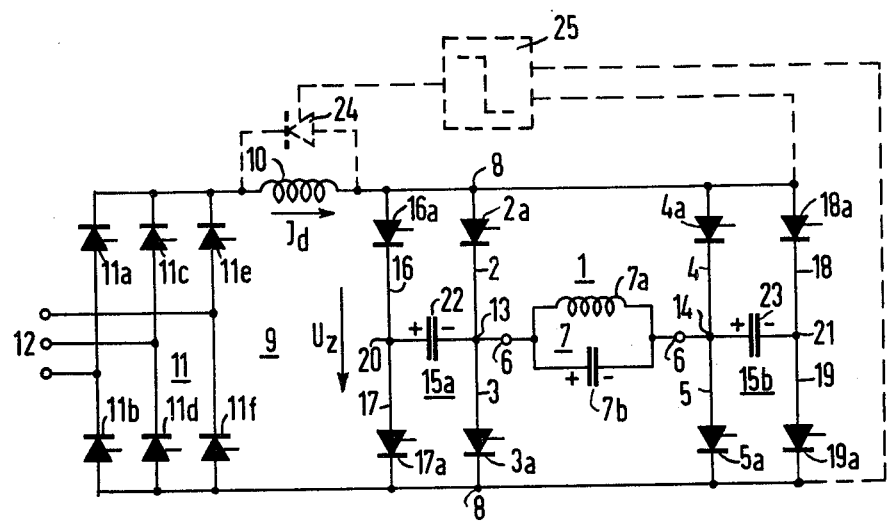
FIG. 1 illustrates a cycloconverter in accordance with the principles of the present invention.

FIG. 1 shows a cycloconverter in accordance with the principles of the present invention. The cycloconverter comprises an inverter 1 formed from thyristors 2a to 5a arranged in a single-phase bridge circuit, each thyristor being disposed in a different one of the bridge branches 2 to 5 of the inverter. The output terminal 6 of the inverter 1 supplies a load which is in the form of a parallel resonant circuit 7 comprised of a parallel arrangement of a choke 7a and a capacitor 7b. The DC terminals 8 of the inverter 1 are connected, via an intermediate DC link comprising a smoothing choke 10 and a rectifier 11, to a three-phase network whose terminals 12 are connected to the rectifier 11. The rectifier 11 comprises the thyristors 11a to 11f which are arranged to form a three-phase bridge circuit.

The bridge branches 2 and 3 of the inverter 1 are connected together at a common main terminal 13 and the bridge branches 4 and 5 of the inverter 1 are connected together at a common main terminal 14. The former and latter pairs of bridge branches, respectively, are connected in parallel with the portions 15a and 15b of an auxiliary commutating device 15. The portions 15a and 15b of an auxiliary commutating device 15 comprise, respectively, the converter branches 16, 17 and 18, 19, respectively. The latter pair of converter branches have a common main terminal 20 and the former a common main terminal 21. Thyristors 16a to 19a are provided in the converter branches 16 to 19 respectively. These thyristors are poled in the same direction as the thyristors 2a to 5a of the bridge branches 2 to 5 of the inverter 1.

Arranged between the main terminals 20 and 13 of the sets of bridge branches 2, 3 and 16, 17 and between the main terminals 14 and 21 of the sets of bridge branches 4, 5 and 18, 19 are commutating capacitors 22 and 23, respectively. In the present illustrative example, the commutating capacitors 22 and 23 have the same capacity. Thus the auxiliary commutating device 15 can be considered as a bridge circuit which is connected parallel to the inverter bridge 1 and which has its AC outputs connected to those of the inverter 1 via the commutating capacitors 22 and 23.

The thyristors 2a to 5a, 11a to 11f and 16a to 19a of the inverter 1, the controlled rectifier 11, and the auxiliary commutating device 15 are operated by conventional control devices which have not been shown in the figure to preserve the clarity of the presentation. Typically, the control device for operating the rectifier 11 my be similar to the devices disclosed by G. Moeltgen in his book "Line-Commutated Thyristor Converters" Siemens AG, Pitman Publishing, 1972, page 302 to 307. Likewise, control devices for the inverter and the auxiliary commutating device 15 may be similar to those disclosed in the book by D. Ernst and Dr. Stroele, "Industrieelektronik", SpringerVerlag, 1973, pages 54 and 55. Actual value transmitters in the form of current transformers in the feed line of the rectifier 11 and a voltage-determining device at the resonant circuit 7 are also provided for control purposes in the cycloconverter of FIG. 1. Again, for the purposes of clarity, these actualvalue transmitters have not been specifically shown in the Figure. Typically, transmitters of the type disclosed in U.S. Pat. No. 3,599,078 can be employed.

During the normal operating condition, the thyristors 2a and 5a or 3a and 4a of the diagonal bridge branches 2 and 5 or 3 and 4 of the inverter 1 are alternately fired at the frequency of the resonant-circuit voltage $U_s$ of the parallel-resonant circuit 7. Such firing takes place, taking account for the protection time of the thyristors, shortly prior to each zero crossing of the resonant-circuit voltage. After firing, the commutation takes place directly from one bridge branch to the bridge branch that conducts next, the reactive commutation power being made available by the capacitor 7b of the parallel-resonant circuit 7.

In the start-up phase of the cycloconverter the charge of the capacitor 7b is not sufficient for direct commutation. The commutation is, therefore, accomplished in this operating condition indirectly, and provision is made at the same time to charge the capacitor 7b as quickly as possible to a point where the capacitor charge is sufficient for direct commutation. The aforesaid operation of the cycloconverter in the start-up phase will be explained in greater detail with reference to FIG. 2.

Figure 2:
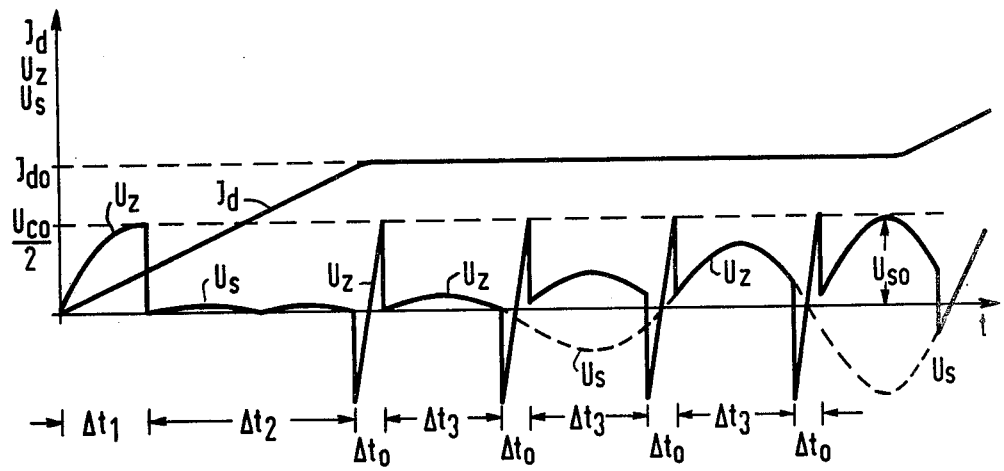
FIG. 2 illustrates signal waveforms in the cycloconverter of FIG. 1 during the start-up phase of operation thereof.

More particularly, in FIG. 2 the current $I_d$ in the smoothing choke 10, the intermediate-link voltage $U_z$ at the DC inputs 8 and the resonant-circuit voltage $U_s$ at the capacitor 7b of the parallel resonant circuit 7 are plotted versus the time $t$. At the start of operation, the thyristors 16a and 19a or 18a and 17a in the two diagonal converter branches 16 and 19, or 17 and 18 of the auxiliary commutating device 15 are first fired. In the following discussion it will be assumed that the former situation pertains, i.e., that the thyristors 16a and 19a are first fired. These thyristors remain conducting for a time interval $\Delta t_1$, at which time a voltage $U_{co}/2$ having the polarity indicated in FIG. 1 appears at the commutating capacitors 22 and 23. At this time, the thyristors 2a and 5a or 3a and 4a in the diagonal bridge branches 2 and 5 or 3 and 4 of the inverter 1 are fired. The combined voltage on the commutation capacitors 22 and 23 then appears as a negative cut-off voltage to the thyristors 16a and 19a of the auxiliary commutating device 15 and the latter are extinguished. In the ensuing discussion it will be assumed that the thyristors 3a and 4a have been fired.

The thyristors 3a and 4a remain conducting for a time interval $\Delta t_2$. During this interval, the current $I_d$ increases to an initial current $I_{do}$ of predetermined magnitude. The initial current $I_{do}$ is monitored by the current transformers (not shown) in the feed line of the rectifier 11 and maintained constant during the remainder of the starting phase by controlling the thyristors 11a to 11f of the rectifier 11. At the end of the second interval $\Delta t_2$ the thyristors 17a and 18a of the next current-conducting converter branches 17 and 18 of the auxiliary commutating device 15 are fired. The voltage on the commutating capacitors 22 and 23 now appears as a negative cut-off voltage to the thyristors of the inverter 1 and the current-carrying thyristors 3a and 4a are cut off. In a constant time interval $\Delta t_0$ the voltage of the commutating capacitors 22 and 23 is reversed from $-U_{co}/2$ to $+U_{co}/2$. This time interval $\Delta t_0$ is a function of the capacity $C_K$ of the commutating capacitors 22 and 23, the voltage $U_{co}$ and the current $I_{do}$ and is expressed in terms of latter parameters as follows:

$$\Delta t_0 = C_K \cdot U_{co}/I_{do}$$

At the end of the constant time interval $\Delta t_0$, the thyristors 2a and 5a of the bridge branches 2 and 5, which are to conduct next, are fired, take over the current, and the current-carrying thyristors 17a and 18a of the auxiliary commutating device 15 are extinguished. Now current flows through the load, charges the capacitor 7b and excites an osillation in the parallel resonant circuit. At the end of a time interval $\Delta t_3$, which time interval is a function of the resonant frequency of the parallel resonant circuit, the thyristors 16a and 19a in converter branches 16 and 19 are again fired. This firing occurs shortly before the first zero crossing of the resonant-circuit voltage $U_s$. At the end of the constant time interval $\Delta t_0$, the thyristors 3a and 4a in bridge branches 3 and 4 of the inverter 1 are fired, the exact instant of firing depending on the protection time determination for the thyristors.

As indicated in FIG. 2, the above-described switching cycle and resultant commutation is repeated during the starting up of the cycloconverter prior to every zero crossing of the resonant-circuit voltage $U_s$. The resonant-circuit voltage $U_s$, in turn, continually increases until it reaches a value of predetermined magnitude $U_{so}$, which is sufficient for direct commutation. From the time the voltage $U_s$ reaches the value $U_{so}$ the thyristors 16a to 19a of the auxiliary commutating device 15 remain unfired and normal operation of the cycloconverter begins. Also at this time the current $I_d$ is no longer held constant, but is increased. It should be noted that in FIG. 2 only a few of the switching cycles occurring during the start up condition have been shown. In actuality, the number of switching cycles is considerably greater. It should be further noted that the cycloconverter of FIG. 1 whose starting condition is characterized by change reversal of the commutating capacitors during a constant time span which depends on a constant initial current and the initial charge of the commutating capacitors, can be modified to include an overvoltage protection device.

More particularly, such a modification of the cycloconverter of FIG. 1 is depicted by the overvoltage protection device shown in dashed lines in the Figure. As shown, the smoothing choke 10 is shunted by a thyristor 24. The latter thyristor is poled so that the self-induction voltage occurring at the smoothing choke when current is drawn is applied to the thyristor 24 in the conduction direction. The firing electrode of the thyristor 24 is connected to the output of a limit indicator 25, the inputs of which are connected to the DC inputs 8 of the inverter 1. If an overvoltage occurs, the thyristor 24 is fired via the limit indicator 25 to thereby reduce the overvoltage. It should be emphasized that the cycloconverter need not be switched off when the overvoltage protection device responds by firing the thyristor 24.

As can be appreciated from the above, designing the present cycloconverter as above-described greatly simplifies the starting up procedure. As compared to presently known cycloconverters, starting up is very soft and voltage build-up is substantially independent of the load. At the same time, the control means required for the indirect commutation during starting up is greatly simplified.

In particular, no expensive additional logic circuitry is required and only those variables have to be measured which are already required to be measured during normal operation. Thus, no additional measuring sensors are required. In addition, the auxiliary commutating device can be designed for a fraction of the resonant-circuit power, i.e., the thyristors of the auxiliary commutating device need have power ratings which are smaller by an order of magnitude than the ratings of the main thyristors and the capacity of the commutating capacitors can be relatively small, e.g., in the order of 10 $\mu F$.

What is claimed is:

1. A method of operating a cycloconverter, the cycloconverter being adapted for use with a load comprising a parallel resonant circuit and for use with an intermediate DC link supplied by an AC voltage source and including a smoothing choke and a controlled rectifier, the cycloconverter including:
    an inverter circuit comprising a bridge circuit having output terminals adapted to be connected to said load and input terminals adapted to be connected to said DC link, said bridge circuit including:
        first and second bridge branches having a first common terminal therebetween; each of said first and second bridge branches including a controllable thyristor;
        third and fourth bridge branches having a second common terminal therebetween, each said third and fourth bridge branches including a controllable thyristor;
    an auxiliary commutating device including:
        first and second converter branches having a third common terminal therebetween and connected in parallel with said first and second bridge branches, each said converter branches including a controllable thyristor poled in the same direction as the thyristors of said bridge branches;
        third and fourth converter branches having a fourth common terminal therebetween and connected in parallel with said third and fourth bridge branches, each said third and fourth converter, branches including a thyristor poled in the direction of the thyristors of said bridge branches;
    and first and second commutation capacitors; said first commutation capacitor being connected to said first and third common main terminals and said second commutation capacitor being connected to said second and fourth common main terminals;
    the method including a start-up phase comprising:
        firing thyristors of diagonal converter branches and maintaining the fired converter thyristors in conduction until the voltage on each commutating capacitor reaches a predetermined magnitude;
        thereafter, firing thyristors of diagonal bridge branches of the inverter and maintaining the fired inverter thyristors in conduction until a constant current of predetermined magnitude flows;

controlling the rectifier so as to maintain the constant current constant throughout the succeeding steps;

firing thyristors of the converter branches which are next in succession to be brought into conduction;

after a predetermined time interval determined by the voltage of predetermined magnitude and said constant current, firing the thyristors of the bridge branches next in succession to be brought into conduction;

and repeating the immediately preceding two steps in succession prior to each said resonantcircuit voltage makes a zero crossing until said resonant circuit voltage reaches a predetermined magnitude.

* * * * *